D. Lane,
Circular Saw Mill.
Nº 59,846. Patented Nov. 20, 1866.
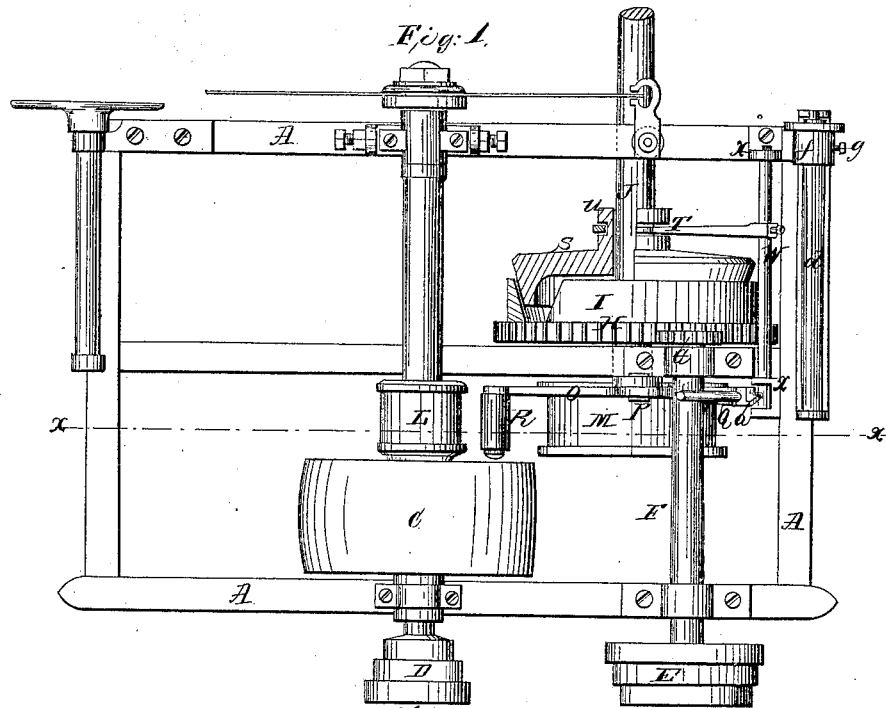
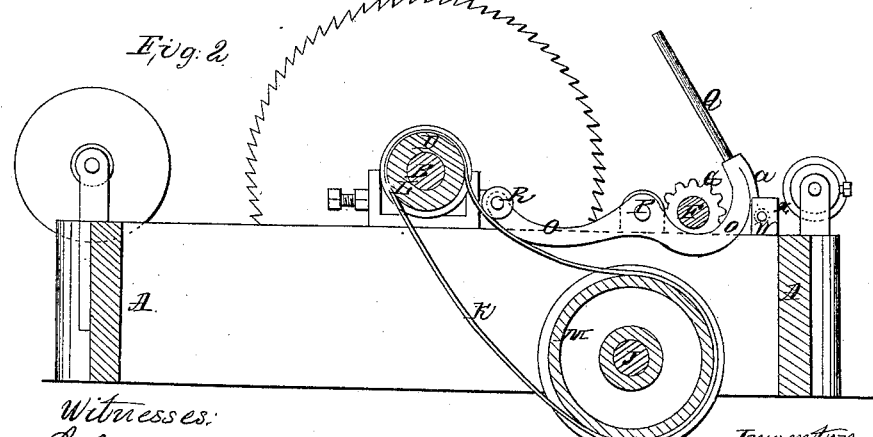

United States Patent Office.

IMPROVEMENT IN SAW MILLS.

DENNIS LANE, OF MONTPELIER, VERMONT.

Letters Patent No. 59,846, dated November 20, 1866.

SPECIFICATION.

TO ALL WHOM IT MAY CONCERN:

Be it known that I, DENNIS LANE, of Montpelier, in the county of Washington, and State of Vermont, have invented new and useful improvements in Saw Mills, and I do hereby declare that the following is a full, clear, and exact description thereof, which will enable others skilled in the art to make and use the same, reference being had to the accompanying drawings forming a part of this specification.

The present invention consists principally in a novel arrangement of devices to be interposed between the driving-shaft of a saw mill and the shaft through which the travelling-carriage of the mill carrying the log to the saw-blade receives this motion, but connected with the two in such a manner that the movement of the said carriage can be reversed or changed in direction at pleasure, so that after the entire length of the log being sawed, or any desired portion of the same has been subjected to the action of the saw-blade, the carriage can then be immediately "gigged back," so termed, without arresting the movement of the mill or changing the direction in which the circular saw revolves.

In accompanying plate of drawings my improvements in saw mills are illustrated.

Figure 1 being a plan or top view of such portion of the mill as is embraced by my improvements, and Figure 2, a vertical section taken in the plane of the line x x, fig. 1.

Similar letters of reference indicate like parts.

A, in the drawings, represents such portion of the framework of the saw mill as is necessary for showing the present invention; B, the driving-shaft of the saw, having pulley C to be connected with the driving power used, through an endless belt, which shaft turns in suitable bearings upon the framework A, and has upon one end the circular saw-blade shown in red in the drawings, the hanging of which may be by any of the ordinary modes; D, a pulley on shaft B which, through a belt, is to be connected with the pulley E on one end of a horizontal shaft, F, turning in bearings upon the framework A, on the other end of which shaft F is a pinion gear-wheel, G, interlocking with the raised toothed-edge, H, of a loose pulley or wheel, I, of a horizontal shaft, J, turning in bearings upon the framework A, through which shaft the travelling-carriage of the mill by which the log is carried to the saw-blade receives its motion; K, an endless belt passing loosely around the pulley L of driving-shaft and pulley M of shaft J, to tighten which belt about the said pulleys, and thus throw the operating shaft J into direct connection with the driving-shaft of the saw, I have arranged a lever-arm, O, hung and turning upon a fulcrum attached to the framework at P with a handle, Q, at one end, and a friction-roller, R, at its other end, above the said belt K, so that, by moving the said lever-handle Q toward the driving-shaft of the mill, the friction-roller R will be depressed and brought to bear against the said belt, thus tightening the same about the pulleys L and M, and consequently causing motion to be then communicated through it to the operating-shaft for the travelling log carriage, turning it in the same direction, and thus "gigging back" the said carriage, as is obvious; the feeding of which forward is accomplished by raising said friction-roller R from the belt K, thus releasing the tension thereon, and consequently disconnecting the saw-shaft from the carriage operating-shaft J, but at the same time throwing it into connection with such shaft J, through the pinion-shaft, by means of the following arrangement of parts, viz:

S is a conical-shaped friction-wheel or clutch, hung by a slot and pin, or in any other suitable manner, upon the shaft J, so as to turn with it, but yet be free to be moved forward and backward thereon; which wheel is of sufficient size that when moved toward and placed within the hollow loose wheel of the shaft J it will come to a close and tight bearing therewith, consequently causing the shaft J, through such loose wheel then in connection with it, by and through the pinion-wheel of the intermediate revolving shaft connected with the driving-shaft, as before explained, to be revolved, thus operating or moving the travelling log-carriage—the direction of its movement in this case being, as is obvious, directly opposite to that imparted to it when its operating-shaft J was in direct connection with the driving or circular saw-shaft, as hereinbefore explained; or, in other words, in such a direction as to feed the log-carriage forward to the saw.

To operate the sliding-clutch S, hereinbefore referred to, I connect it with the lever handle Q through the forked end, T, (partially embracing its collar portion, U,) of the arm V, fixed to a horizontal slide-rod, or bar W, moving in guides or ways X X of the framework A, with which slide at one end Y the raised cam or curved lip, or edge a upon the circular or bent portion b of the lever-arm O engages—the direction of this cam-lip a being such that when the handle of the lever-arm O is moved in the proper direction to bring the friction-roller to bear against the loose belt, and thus tighten the same, it will operate the slide W in the proper direction to throw the friction-clutch S out of connection with the loose pulley of the carriage operating-shaft J, and *vice versa*, whereby, as is obvious, without arresting or in the least degree interfering with the revolution of the circular saw, the log-carriage can be thrown into proper connection with the driving-shaft of the saw at any time desired, to be either fed forward or "gigged backward," and by a simple movement of a lever handle in the proper direction therefor—the convenience and many advantages of which are self-apparent to all conversant with the running of saw mills.

In order to saw boards of varying thickness from the log I have arranged upon the framework A at right angles to the plane of revolution of the circular-saw a fixed graduated rod or bar $d$, upon which is a sliding collar $f$, having a set screw, $g$, by moving and setting which collar, at any desired position upon the said rod, as indicated by its graduation, and then bringing the log up and against the same, it is obvious that with this arrangement boards of any thickness within the scope of the log can be thus sawed from the log.

It may be here remarked in conclusion that the above described device for regulating the thickness of the boards sawed from the log may be used, if so desired, in connection with the arrangements of parts for feeding the log up to the saw-blade, embraced in Letters Patent heretofore granted to me on improvements in saw mills.

Having thus described my invention, I claim as new, and desire to secure by Letters Patent—

Operating the carriage by means of the lever-arm Q, with its lip $a$, and friction-roller R, belt K, pulleys L and M, clutch S, hollow loose wheel I, operating-shaft J, forked arm V, and slide W, constructed and arranged substantially as described for the purpose specified.

DENNIS LANE.

Witnesses:
EDWIN LANE,
M. C. HOOKER.